US008056072B2

(12) United States Patent
Andrews et al.

(10) Patent No.: US 8,056,072 B2
(45) Date of Patent: Nov. 8, 2011

(54) REBOOTLESS DISPLAY DRIVER UPGRADES

(75) Inventors: Marcus J. Andrews, Bellevue, WA (US); Max A. McMullen, Redmond, WA (US); Sameer A. Nene, Redmond, WA (US); Youssef M. Barakat, Bothell, WA (US); Ameet A. Chitre, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1064 days.

(21) Appl. No.: 11/263,765

(22) Filed: Oct. 31, 2005

(65) Prior Publication Data
US 2007/0101343 A1 May 3, 2007

(51) Int. Cl.
*G06F 9/445* (2006.01)

(52) U.S. Cl. ......... 717/169; 717/170; 717/174; 717/175

(58) Field of Classification Search .................. None
See application file for complete search history.

(56) References Cited

U.S. PATENT DOCUMENTS

| | | | | |
|---|---|---|---|---|
| 5,682,529 A | 10/1997 | Hendry et al. | ........... | 395/653 |
| 5,831,639 A | 11/1998 | Conticello | ........... | 345/511 |
| 5,889,965 A * | 3/1999 | Wallach et al. | ........... | 710/302 |
| 6,009,274 A * | 12/1999 | Fletcher et al. | ........... | 717/173 |
| 6,009,480 A * | 12/1999 | Pleso | ........... | 710/8 |
| 6,115,026 A | 9/2000 | Spurlock | ........... | 345/132 |
| 6,345,319 B2 | 2/2002 | Lin et al. | ........... | 710/8 |
| 6,658,489 B1 | 12/2003 | Asselin | | |
| 6,832,312 B1 | 12/2004 | Rochford, II | ........... | 713/100 |
| 6,928,543 B2 | 8/2005 | Hendry et al. | ........... | 713/100 |
| 7,080,247 B2 * | 7/2006 | Rochford et al. | ........... | 713/100 |
| 7,506,147 B2 * | 3/2009 | Bellinger et al. | ........... | 713/1 |
| 2002/0073415 A1 | 6/2002 | Kim et al. | ........... | 717/173 |
| 2003/0065773 A1 | 4/2003 | Aiba et al. | ........... | 709/224 |
| 2004/0019896 A1 | 1/2004 | Yu | ........... | 719/321 |
| 2004/0025156 A1 | 2/2004 | Rochford, II et al. | ........ | 717/174 |
| 2004/0031030 A1 * | 2/2004 | Kidder et al. | ........... | 717/172 |
| 2004/0098427 A1 | 5/2004 | Peng | ........... | 707/205 |
| 2004/0181796 A1 | 9/2004 | Fedotov et al. | ........... | 719/323 |
| 2006/0195840 A1 * | 8/2006 | Sundarrajan et al. | ........ | 717/176 |

FOREIGN PATENT DOCUMENTS

| | | |
|---|---|---|
| EP | 1 465 065 A2 | 10/2004 |
| JP | 8-069430 A | 3/1996 |
| JP | 11-203120 A | 7/1999 |
| JP | 2001-318874 A | 11/2001 |
| RU | 2137182 C1 | 9/1999 |
| RU | 2237275 C2 | 9/2004 |
| WO | WO 95/08801 | 3/1995 |
| WO | WO 02/04461 | 1/2002 |

OTHER PUBLICATIONS

"Installing Drivers and Utilities without Rebooting on Windows", http://www.microsoft.com/whdc/system/pnppwr/pnp/no_reboot.mspx, Version 1.0a, Dec. 4, 2001, 8 pages.

(Continued)

*Primary Examiner* — Chuck O Kendall
(74) *Attorney, Agent, or Firm* — Woodcock Washburn LLP

(57) ABSTRACT

Systems and methods for rebootless updating of a IHV display driver are disclosed. According to such a method, first, the operating system stops the driver from running. Second, the system switches over to an interim or temporary display driver, which be a default driver provided with the operating system. Third, the new hardware-specific driver is started. Thus, a hardware-specific display driver may be updated without rebooting.

20 Claims, 3 Drawing Sheets

OTHER PUBLICATIONS

"Reader Driver Install Notes", Reflex USB v.3 Windows 2000/XP, http://www.reflexreaders.com/Support/rusbv3_w2k_readme.pdf, 2005, 4 pages.

"Maximizing Solaris Quality of Service-the Role of Fobre Channel HBAs", What to Look for in No-reboot Solaris Drivers, http://www.emulex.com/pdfs/solaris-maximizing.pdf, 2004, 6 pages.

"X-ray Vision: Device Drivers", Performing Key Work behind the Scenes, Feb. 2004, 4(2), 6 pages, http://www.computerpoweruser.com/editorial/article.asp?article=articles/archive/c0402/2.

Installing Drivers and Utilities without Rebooting on Windows, Dec. 4, 2001, 1-8, XP-002506623.

PCT Application No. PCT/US2006/039128: International Search Report and the Written Opinion of the International Searching Authority, Feb. 13, 2007, 10 pages.

"NewDisp: Dynamic Reload of a Display Driver", Microsoft Corporation, Apr. 11, 2003, 1 page.

* cited by examiner

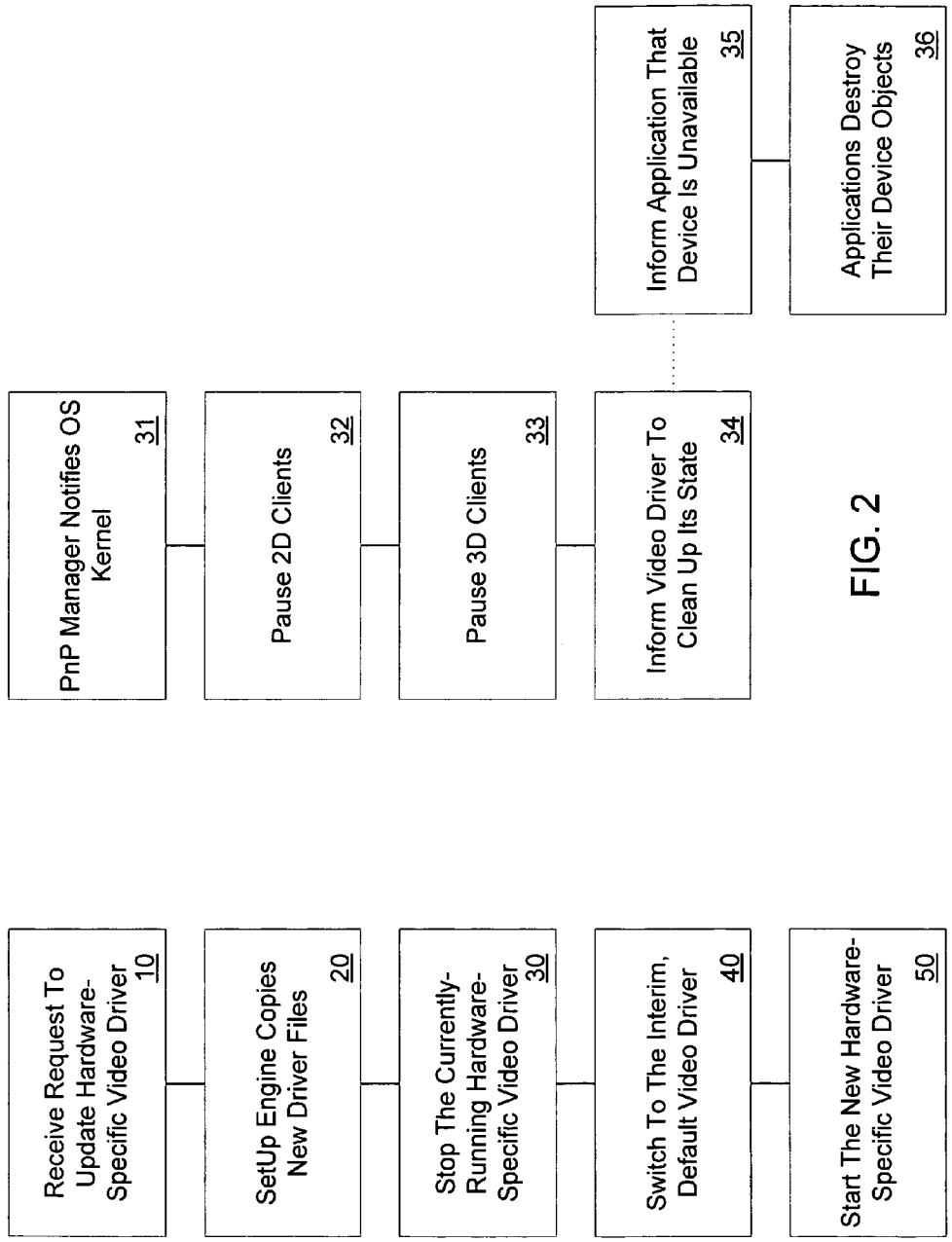

REBOOTLESS DISPLAY DRIVER UPGRADES

BACKGROUND

Updating a hardware-specific display driver (i.e., a display driver that may be used to control video graphics display associated with a piece of hardware) has always required rebooting. Such a hardware-specific display driver may be referred to as an independent hardware vendor (IHV) display driver.

In previous operating systems, it was not possible to update the display driver without requiring a reboot. The graphics architecture in these operating systems did not support the fact that a display driver would be completely "stopped" from running and then dynamically updated to a completely new display driver. For example, driver resources typically need to be released in order to change to a new driver. In previously-available operating systems, there was no way to release resources. Consequently, the user had to shutdown to release the resources. For the kernel side of the operating system to recognize the presence of a new driver, the user would have to reboot. Also, a driver is typically used by a number of clients. In previously-available operating systems, there was no way to stop clients from using the driver. Accordingly, if the clients could not be stopped from using the driver, then the driver could not be changed. Rebooting the system would force all clients to stop using (i.e., disconnect from) the driver.

It would be desirable, however, if a display driver could be updated without requiring a reboot, while maintaining certain functionality, such as 2D for example, and state of the operating system.

SUMMARY

As disclosed herein, a currently-running hardware-specific display driver may be dynamically switched to a new display driver while the hardware is still running. Such a method may include three steps. First, on a request to update the currently-running driver, the operating system stops the driver from running. Second, the system switches over to an interim or temporary display driver. The interim display driver may be a default driver provided with the operating system (such as the VGA driver provided with the Microsoft WINDOWS operating system). Third, the new hardware-specific driver is started. The 3D state is restored, and the GPU continues to work normally, with full functionality. Thus, a hardware-specific display driver may be updated without rebooting.

BRIEF DESCRIPTION OF THE DRAWINGS

FIG. 1 is a flowchart of a method for upgrading a display driver without rebooting.

FIG. 2 is a flowchart of a method for stopping a currently-running hardware-specific display driver.

DETAILED DESCRIPTION OF ILLUSTRATIVE EMBODIMENTS

Figure 3:
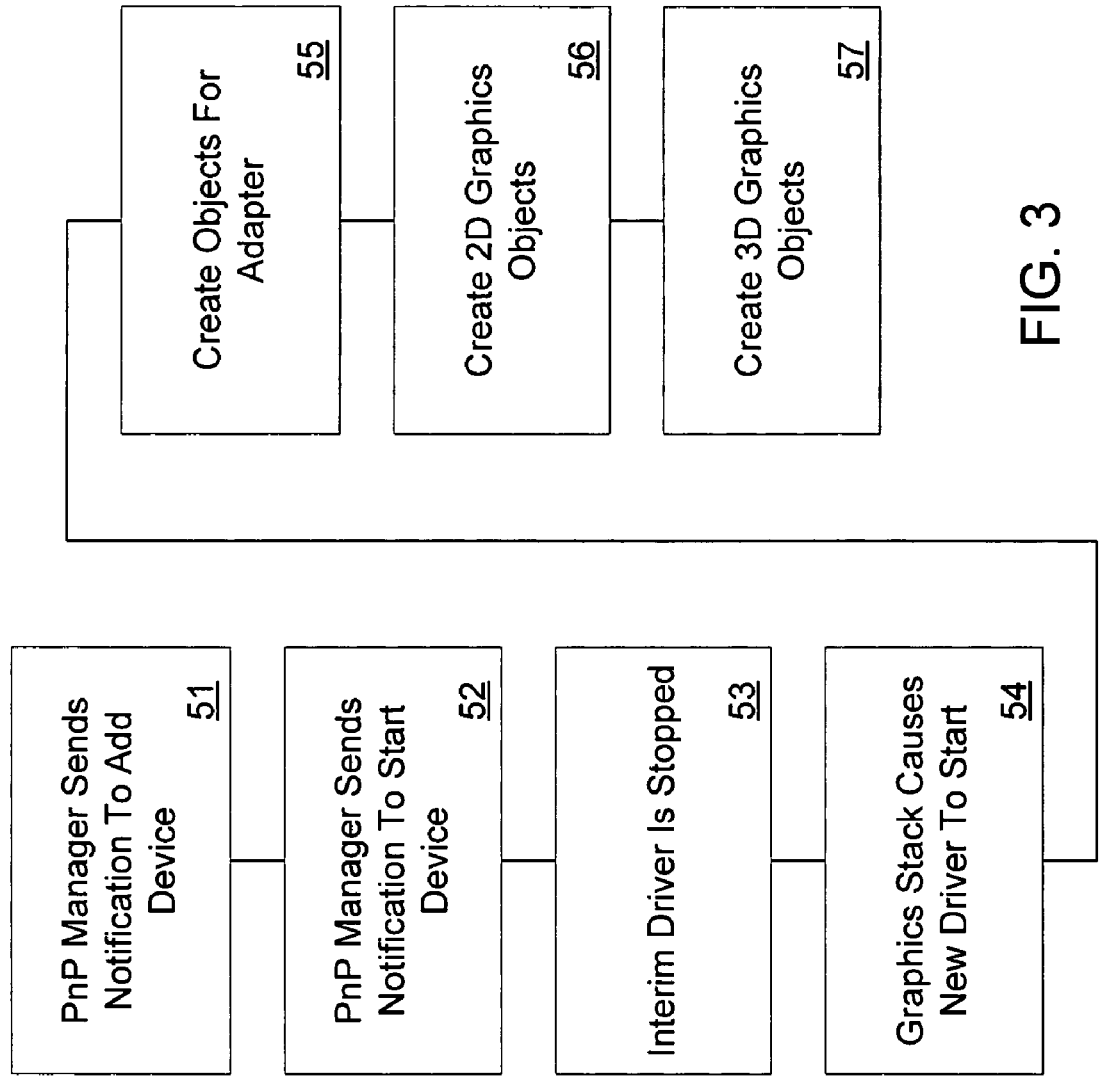
FIG. 3 is a flowchart of a method for starting a new hardware-specific display driver.

FIG. 1 is a flowchart of a method for upgrading a hardware-specific display driver without rebooting. At 10, the operating system may detect that a user has requested a display driver upgrade. A user may make such a request by, for example, downloading the upgraded display driver from the Web into memory on the host computer, or uploading the upgraded driver into memory on the host computer from a CD.

To install the upgraded display driver onto the host computer, the user may run a so-called "setup engine" on the host computer. At 20, the setup engine copies the files associated with the upgraded display driver into memory on the host computer. It should be understood that, in prior systems, such new display driver files were deposited somewhere in memory, and, upon the next startup, were detected and used. In a system as disclosed herein, the new files may be copied as in previous systems, and stored in memory until the new driver is started (as described in detail below).

At 30, the currently-running hardware-specific driver is stopped. A method for stopping a currently-running hardware-specific display driver is described in detail below in connection with FIG. 2.

At 40, control is switched to an interim display driver. The interim display driver may be a default driver provided with the operating system (such as the VGA driver provided with the Microsoft WINDOWS operating system). When the currently-running hardware-specific display driver is stopped, there is no display driver running on the system. This would result in a black screen and an unpleasant user scenario. To avoid this, the VGA driver, which is already loaded in the system, is now started being used. Until the new hardware-specific driver is installed, the desktop is displayed using the VGA driver.

In order for hardware to draw anything to the screen, it must have some resources allocated to it. These are allocated by the operating system to the graphics hardware. Accordingly, when the currently-running driver is stopped at 30, sufficient resources are still allocated to enable the default driver to run in the interim. For example, certain memory and I/O resources may stay allocated. It should be understood that this is different from what would happen in most stacks. For most devices, all resources would be released after the driver is stopped, because, after the driver has been stopped, use of the hardware would be prohibited.

At 50, the upgraded hardware-specific display driver is started. A method for starting a new hardware-specific display driver is described in detail below in connection with FIG. 3. Thus, a hardware-specific display driver may be updated without rebooting.

FIG. 2 is a flowchart of a method for stopping a currently-running hardware-specific display driver. When the user triggers the update of the currently-running display driver, it starts a sequence of stopping the device and updating it. At 31, the Plug-and-Play (PnP) Manager, on seeing a driver update request (from user initiation, for example, such as by downloading a new driver from the Web, etc.), starts this process by sending a notification message, such as an I/O request packet (IRP), to the graphics device stack. The notification message commands the device to do whatever it has to do to release all dependencies on the display driver software. This IRP may be handled by a sub-component (DxgPort) of the operating system kernel (DxgKrnl.sys).

There are two categories of clients that need to be paused. First, Win32K, the older (2D) part of the graphics stack in WINDOWS (GDI) is stopped at 32. The operating system shell is notified to stop using the device. Also, the kernel pauses all clients.

At 33, the second category of clients is paused. The second category includes Direct3D clients. When these clients are paused, everything that was allocated on behalf of those clients has been deleted. When step 33 is finished, nothing associated with the IHV driver will be left in the kernel mode. At this point, there is no Video Memory Manager and Video Scheduler activity.

At 34, on seeing the PnP manager request, DxgPort will call the IHV kernel-mode driver through its registered "DmStopDevice" DDI. The operating system informs the display driver to clean up any memory, for example, or anything else the display driver has to clean up. The IHV driver is responsible for cleaning up its state in this function. It releases all held resources and undoes all activities which the driver started in the DmStartDevice function.

After step 34, whenever an application calls in to do graphics, the application is told that the hardware is unavailable and that the application should clean up any of its resources. At 35, the DirectX runtime receives a "Device Lost" notification from DxgKrnl. This notification is forwarded, at 36, onto the DirectX applications. New DirectX9L applications will destroy their device objects. DirectX9 and previously written applications may or may not destroy the device. It should be understood that DirectX refers to WINDOWS 3D graphics (dxg=directX graphics).

Preferably, the applications are notified of the new driver only when they call in to do graphics. That is, when they want to use the old driver, they are told that it is unavailable. Then, new DirectX9L applications reroute themselves to the new driver (which is the updated IHV driver). When DirectX9 and previously written applications find out that the old driver has been unloaded, D3D runtime spoofs to the application, pretending that the driver is still there.

FIG. 3 is a flowchart of a method for starting a new hardware-specific display driver. After the driver files have been copied over successfully, the setup engine informs the PnP manager. Then, the PnP manager loads the new device driver into memory. At 51, the PnP manager sends to the graphics stack (dxgport) a notification message to add a new device. The PnP Manager will then call the "AddDevice" routine in DxgPort and subsequently the IHV driver. At 52, the PnP manager sends to the graphics stack a notification message (IRP) to start the new device.

At 53, the kernel (graphics stack) stops the interim driver. Preferably, the VGA driver is now stopped from running, but it is still loaded. A black screen may appear momentarily.

At 54, the graphics stack calls the updated video display driver through a device-driver interface ("DDI") that initializes the graphics hardware and allocates the necessary display driver resources. The graphics stack tells new IHV driver to start. At 55, the graphics stack notifies the kernel to create the corresponding objects for the adapter. These were destroyed when the device was stopped.

At 56, 2D graphics objects are restored. Win32K is notified to create the corresponding views and its graphics device objects. Monitor objects are also created at this point through the kernel graphics stack. At 57, 3D graphics objects are restored. The 3D graphics software requests that the applications recreate their device objects, after which the applications can restart rendering, i.e., using the new and updated driver.

Example Computing Environment

Figure 4:
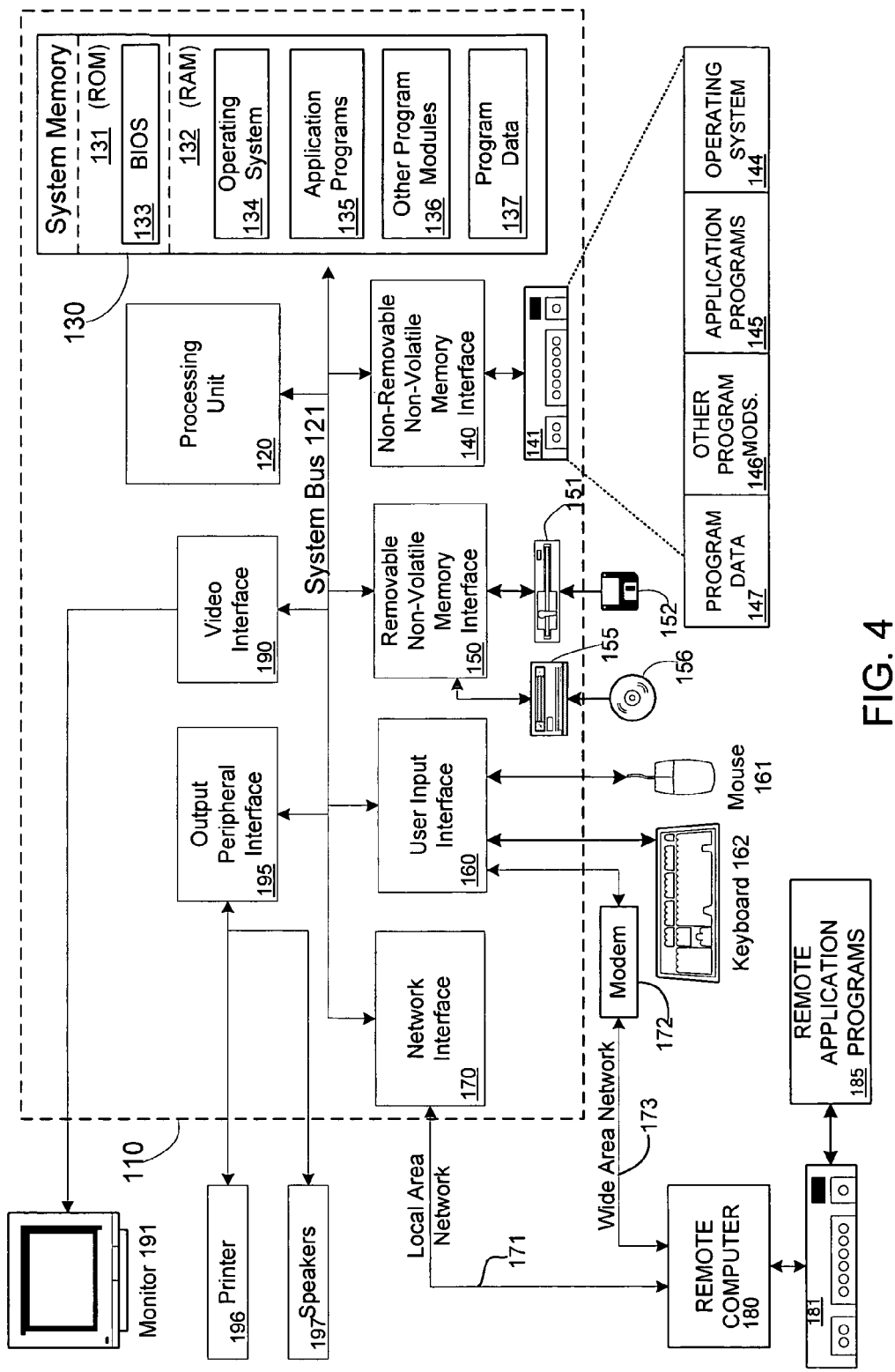
FIG. 4 is a block diagram showing an example computing environment in which aspects of the invention may be implemented.

FIG. 4 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 4 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 4, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 4 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 4 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 4 provide storage of computer readable instructions, data structures, program modules and other data for the computer 110. In FIG. 4, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 4. The logical connections depicted in FIG. 4 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 4 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Thus, there have been described systems and methods for rebootless updating of a video display driver. Though the invention has been described in connection with certain preferred embodiments depicted in the various figures, it should be understood that other similar embodiments may be used, and that modifications or additions may be made to the described embodiments for practicing the invention without deviating therefrom. The invention, therefore, should not be limited to any single embodiment, but rather should be construed in breadth and scope in accordance with the following claims.

What is claimed:

1. A rebootless method for upgrading a current display driver that is running on a host computing system, the method comprising:
    loading an upgraded display driver on to the host computing system;
    stopping the running of the current display driver without releasing all of the resources allocated to the current display driver; and
    starting the upgraded display driver without having rebooted the host computing system since the time of loading the upgraded display driver on to the host computing system, wherein starting the upgraded display driver comprises a plug-and-play manager sending a notification to commence routines to add and start a new device to initiate using the upgraded display driver.

2. The method of claim 1,
    stopping the running of the current display driver is carried out in response to an upgrade request.

3. The method of claim 1, wherein loading the upgraded display driver on to the host computing system comprises a setup engine copying files associated with the upgraded display driver into a memory on the host computing system.

4. The method of claim 1, further comprising starting an interim display driver, which is located in the host computing system, prior to starting the upgraded display driver, the interim display driver using at least some of the resources that were not released when the current display driver was stopped.

5. The method of claim 4, wherein the interim display driver is a default driver provided with an operating system running on the host computing system.

6. The method of claim 5, wherein, after the current display driver is stopped, sufficient resources remain allocated to enable the default driver to run in the interim before starting the upgraded display driver.

7. The method of claim 1, wherein stopping the current display driver comprises the plug-and-play manager sending a notification to release a dependency on video display driver software.

8. The method of claim 1, wherein stopping the running of the current display driver comprises pausing a video display client.

9. The method of claim 1, wherein stopping the running of the current display driver comprises informing the current display driver to clean up its state.

10. The method of claim 1, further comprising starting an interim display driver, wherein the interim display driver is in communication with the host computing system.

11. The method of claim 4, wherein starting the upgraded display driver comprises stopping the interim display driver.

12. A computer readable storage medium comprising computer executable instructions that when executed by a processor cause said processor to perform a rebootless method for transitioning to a second display driver on a host computing system, the method comprising:
    loading the second display driver on to the host computing system;
    stopping a first display driver that is currently running on the host computing system;
    receiving a call from an application to perform a graphics operation associated with the first display driver;
    informing the application that the first display driver is unavailable and directing the application to release any resources that the application had allocated for use with the first display driver;
    starting the second display driver on the host computing system without rebooting the host computing system since the time of loading the second display driver on to the host computing system, wherein starting the second display driver comprises a plug-and-play manager sending a notification to commence routines to add and start a new device to initiate using the second display driver; and
    executing the call from the application by using the second display driver.

13. The computer readable storage medium of claim 12, wherein the call from the application is received after the first display driver is stopped.

14. The computer readable storage medium of claim 12, further comprising starting an interim display driver before starting the second display driver.

15. The computer readable storage medium of claim 12, further comprising starting an interim display driver before starting the upgraded display driver.

16. The computer readable storage medium of claim 15, wherein the interim display driver is started after the call from the application is received.

17. The computer readable storage medium of claim 12, wherein executing the call from the application using the second display driver comprises a spoofing procedure.

18. A system for rebootless upgrading of a display driver, the system comprising of:
    an upgraded display driver;
    a first display driver;
    an interim display driver; and
    a processor, configured to:
        stop the first display driver running on a host computing system;
        start the interim display driver; and
        upon receiving a request from an application, running the first display driver, stopping the interim display driver, and starting the upgraded display driver without rebooting the host computing system, wherein starting the upgraded display driver comprises a plug-and-play manager sending a notification to commence routines to add and start a new device to initiate using the upgraded display driver.

19. The system of claim 18, wherein the interim display driver is a default driver provided with an operating system running on the host computing system.

20. The system of claim 18, wherein, stopping the first display driver comprises retaining sufficient resources to enable the interim display software driver to run.

UNITED STATES PATENT AND TRADEMARK OFFICE
CERTIFICATE OF CORRECTION

| | | |
|---|---|---|
| PATENT NO. | : 8,056,072 B2 | Page 1 of 1 |
| APPLICATION NO. | : 11/263765 | |
| DATED | : November 8, 2011 | |
| INVENTOR(S) | : Marcus J. Andrews et al. | |

It is certified that error appears in the above-identified patent and that said Letters Patent is hereby corrected as shown below:

In column 8, line 25, in Claim 14, after "comprising" insert -- instructions for --.

In column 8, line 28, in Claim 15, after "comprising" insert -- instructions for --.

In column 8, line 58, in Claim 20, delete "display software" and insert -- display --, therefor.

Signed and Sealed this
Thirty-first Day of January, 2012

David J. Kappos
*Director of the United States Patent and Trademark Office*